(12) United States Patent
Andriessen et al.

(10) Patent No.: US 6,929,970 B2
(45) Date of Patent: Aug. 16, 2005

(54) PROCESS FOR PREPARING NANO-POROUS METAL OXIDE SEMICONDUCTOR LAYERS

(75) Inventors: Hieronymus Andriessen, Beerse (BE); Joop Van Deelen, Eindhoven (NL); Jan Kroon, Alkhaar (NL)

(73) Assignee: Agfa-Gevaert, Mortsel (BE)

( * ) Notice: Subject to any disclaimer, the term of this patent is extended or adjusted under 35 U.S.C. 154(b) by 4 days.

(21) Appl. No.: 10/659,982

(22) Filed: Sep. 11, 2003

(65) Prior Publication Data

US 2005/0016577 A1 Jan. 27, 2005

Related U.S. Application Data

(60) Provisional application No. 60/411,146, filed on Sep. 16, 2002.

(30) Foreign Application Priority Data

Sep. 12, 2002 (WO) .............................. PCT/EP02/10270

(51) Int. Cl.$^7$ .............................................. H01L 21/00
(52) U.S. Cl. ........................... 438/57; 438/85; 438/104; 438/479
(58) Field of Search ..................... 438/48–98, 479–509; 257/43, 103, 46; 427/405, 376.2; 423/579–594; 136/252–265

(56) References Cited

U.S. PATENT DOCUMENTS

| | | | | |
|---|---|---|---|---|
| 4,927,721 A | | 5/1990 | Gratzel et al. | |
| 5,350,644 A | | 9/1994 | Graetzel et al. | |
| 5,417,956 A | * | 5/1995 | Moser | 423/592.1 |
| 5,879,715 A | * | 3/1999 | Higgins et al. | 424/489 |
| 6,444,189 B1 | * | 9/2002 | Wang et al. | 423/610 |
| 6,458,431 B2 | * | 10/2002 | Hill et al. | 427/537 |
| 6,506,493 B1 | * | 1/2003 | Kumar et al. | 428/402 |
| 6,572,693 B1 | * | 6/2003 | Wu et al. | 106/35 |
| 6,706,795 B1 | * | 3/2004 | Garti et al. | 524/431 |
| 6,723,388 B2 | * | 4/2004 | Svendsen et al. | 427/526 |
| 6,780,393 B2 | * | 8/2004 | Murayama et al. | 423/592.1 |
| 6,841,143 B2 | * | 1/2005 | Inagaki et al. | 423/608 |
| 6,860,982 B2 | * | 3/2005 | Okura et al. | 205/333 |
| 2003/0095903 A1 | * | 5/2003 | Dettling et al. | 423/210 |
| 2004/0046168 A1 | * | 3/2004 | Andriessen | 257/43 |

FOREIGN PATENT DOCUMENTS

| | | |
|---|---|---|
| EP | 1 176 646 A1 | 1/2002 |
| JP | 5-504023 W | 6/1993 |
| KR | 2004/007350 A * | 1/2004 |
| WO | WO 00/72373 A1 | 11/2000 |

OTHER PUBLICATIONS

Nakada, "Electron Transport in Nano–Porous Tio, films and its effect on dye–sensitized Solar Cells" 200 IEEE pp 802–805.*
Li et al, "W/W Redox Reactions at a Interface of the Nanocrystalline TiO Photo actve electrodes".*
Barbe et al.; *Mat. Res. Soc. Symp. Proc.*, 431, 129–134 (1996).
Lindstrom et al.; *Nano Letters*, 1 (2), 97–100 (2001).
O'Regan et al.; *Nature*, 353, 737–740 (Oct. 24, 1991).
O'Regan et al.; *Chem. Mater.*, 7, 1349–1354 (1995).
Pichot et al.; *Langmuir*, 16, 5626–5630 (2000).
Tennakone et al.; *Semicond. Sci. Technol.*, 10, 1689–1693 (1995).

* cited by examiner

*Primary Examiner*—Savitri Mulpuri
(74) *Attorney, Agent, or Firm*—Leydig, Voit & Mayer, Ltd.

(57) ABSTRACT

A process for preparing a layer of a nano-porous metal oxide semiconductor comprising the steps of: (i) providing metal oxide semiconductor nano-particles prepared by a wet precipitation process, (ii) heating said nano-particles at a temperature in the range of 250 to 600° C., (iii) preparing a dispersion of said heat-treated nano-particles from step (ii), (iv) applying said dispersion prepared in step (iii) to a support to produce a coating; and (v) subjecting said coating to a pressure in the range of 100 to 1000 bar at a temperature below 250° C.; a layer of a nano-porous metal oxide semiconductor obtained by this process; and a photovoltaic device comprising a layer of a nano-porous metal oxide semiconductor obtained by this process.

7 Claims, No Drawings

PROCESS FOR PREPARING NANO-POROUS METAL OXIDE SEMICONDUCTOR LAYERS

This application claims the benefit of U.S. Provisional Application No. 60/411,146 filed Sep. 16, 2002, which is incorporated by reference. In addition, this application claims the benefit of International Application No. PCT/EP 02/10270 filed Sep. 12, 2002, which is also incorporated by reference.

FIELD OF THE INVENTION

The present invention relates to a process for preparing nano-porous metal oxide semiconductor layers.

BACKGROUND OF THE INVENTION

There are two basic types of photoelectrochemical photovoltaic cells. The first type is the regenerative cell which converts light to electrical power leaving no net chemical change behind. Photons of energy exceeding that of the band gap generate electron-hole pairs, which are separated by the electrical field present in the space-charge layer. The negative charge carriers move through the bulk of the semiconductor to the current collector and the external circuit. The positive holes are driven to the surface where they are scavenged by the reduced form of the redox relay molecular (R), oxidizing it: $h^+ + R \rightarrow O$, the oxidized form. O is reduced back to R by the electrons that re-enter the cell from the external circuit. In the second type, photosynthetic cells, operate on a similar principle except that there are two redox systems: one reacting with the holes at the surface of the semiconductor electrode and the second reacting with the electrons entering the counter-electrode. In such cells water is typically oxidized to oxygen at the semiconductor photoanode and reduced to hydrogen at the cathode. Titanium dioxide has been the favoured semiconductor for these studies.

Mesoscopic or nano-porous semiconductor materials, minutely structured materials with an enormous internal surface area, have been developed for the first type of cell to improve the light capturing efficiency by increasing the area upon which the spectrally sensitizing species could adsorb. Arrays of nano-crystals of oxides such as $TiO_2$, $ZnO$, $SnO_2$ and $Nb_2O_5$ or chalcogenides such as CdSe are the preferred semiconductor materials and are interconnected to allow electrical conduction to take place. A wet type solar cell having a porous film of dye-sensitized titanium dioxide semiconductor particles as a work electrode was expected to surpass an amorphous silicon solar cell in conversion efficiency and cost. These fundamental techniques were disclosed in 1991 by Graetzel et al. in Nature, volume 353, pages 737–740 and in U.S. Pat. Nos. 4,927,721, 5,350,644 and JP-A 05-504023. Graetzel et al reported solid-state dye-sensitized mesoporous $TiO_2$ solar cells with up to 33% photon to electron conversion efficiences.

In 1995 Tennakone et al. in Semiconductor Sci. Technol., volume 10, page 1689 and O'Regan et al. in Chem. Mater., volume 7, page 1349 reported an all-solid-state solar cell consisting of a highly structured hetero-junction between a p- and n-type semiconductor with a absorber in between in which the p-semiconductor is CuSCN or CuI, the n-semiconductor is nano-porous titanium dioxide and the absorber is an organic dye.

EP-A 1 176 646 discloses a solid state p-n heterojunction comprising an electron conductor and a hole conductor, characterized in that if further comprises a sensitizing semiconductor, said sensitizing being located at an interface between said electron conductor and said hole conductor; and its application in a solid state sensitized photovolaic cell.

A drawback in the manufacture of nano-porous metal oxide semiconductor layers for Graetzel photovoltaic cells is the high temperature needed for making the nano-porous metal oxide semiconductor layer. This is apparently needed to obtain sufficient contact between the nano-porous metal oxide particles to create a conductive pathway for the photogenerated charges (electrons). Although the term sintering is not the appropriate one in this context, this term is often used to describe this heating process. Usually temperatures between 300 and 550° C. are applied for 15 to 90 minutes. Such high temperatures are prohibitive for making photovoltaic cells on plastic and flexible substrates. Such cells would offer a myriad of advantages for this type of photovoltaic cell.

In 1996 C. J. Barbé et al. reported in the Materials Research Symposium Proceedings, volume 431, pages 129–134, the development of a new type of solar cell based on a photo-electrochemical process with which a respectable photovoltaic efficiency of 10% could be obtained by the use of mesoproous, nanostructured films of anatase particles. They also reported on how processing parameters such as hydrothermal growth temperature during autoclaving, binder addition and sintering conditions influence the film porosity and pore size distribution of colloidal $TiO_2$ nanoparticles and consequently affect the solar cell efficiency. Autoclaving temperatures between 200 and 250° C. were used with the average aggregate size and the average pore size increasing with increasing autoclave temperature. Films were fires at 400, 450, 500 and 550° C. at 5°/min in air to study the influence of the heat treatment temperature on the final film morphology.

WO 00/72373 discloses a method for manufacturing a nanostructured porous film electrode, the method characterized by the steps of: preparing a binder-free suspension (21) of electrode material particles (11) in a volatile suspending agent (13), said particles substantially having a size within the nanometer scale, depositing the binder-free particle suspension (21) on a substrate (22) covered with a conducting film, removing the suspending agent (31) by evaporation, and compressing the particles to form an electrically conducting and mechanically stable nanostructured porous film. The process of WO 00/72373 enables the realization of the same solar cell performance with high pressure sintered nano-porous titanium dioxide layers as with conventional high temperature sintering. This finding was confirmed in 2000 by Pichot et al. in Langmuir, volume 16, pages 5625 to 5630, and in 2001 by Lindstrom et al. in Nano Letters, volume 1, pages 97 to 100. However, although this high pressure sintering process appears to work quite well with Degussa P25, a nano-sized titanium dioxide with a mean particle size of 30 nm and a specific surface of 50 $m^2/g$ from DEGUSSA, on a glass substrate or a plastic substrate, it has been found not to work with titanium dioxide particles made by a wet precipitation process.

There is a therefore a need for a low temperature process for preparing nano-porous metal oxide semiconductor layers with nano-particles prepared by wet precipitation processes on supports.

ASPECTS OF THE INVENTION

It is therefore an aspect of the present invention to provide a process for preparing nano-porous metal oxide semiconductor layers with nano-particles prepared by a wet precipitation process on both flexible and rigid supports.

It is a further aspect of the present invention to provide a photovoltaic cell incorporating a nano-porous metal oxide semiconductor layer prepared with nano-particles prepared by a wet precipitation process on flexible and rigid supports.

Further aspects and advantages of the invention will become apparent from the description hereinafter.

SUMMARY OF THE INVENTION

It has been surprisingly found that layers of nano-porous metal oxide semiconductors can be prepared with nano-particles prepared by a wet precipitation process on supports by a process involving preheating the nano-particles at a temperature of 250 to 600° C., applying a coating of these preheated nano-particles to the support and subjecting the coating to a pressure of 100 to 1000 bar, without the application of the high temperatures needed for conventional sintering of titanium dioxide nano-particles i.e. 300 to 550° C.

Aspects of the present invention are realized by a process for preparing a layer of a nano-porous metal oxide semiconductor comprising the steps of: (i) providing metal oxide semiconductor nano-particles prepared by a wet precipitation process, (ii) heating said nano-particles at a temperature in the range of 250 to 600° C., (iii) preparing a dispersion of the heat-treated nano-particles from step (ii), (iv) applying the dispersion of step (iii) to a support to produce a coating; and (v) subjecting said coating to a pressure in the range of 100 to 1000 bar at a temperature below 250° C. An electrically conducting and mechanically stable nano-porous metal oxide semiconductor layer is thereby prepared.

Aspects of the present invention are also realized by a layer of a nano-porous metal oxide semiconductor obtained by the above-mentioned process.

Aspects of the present invention are also realized by a photovoltaic device comprising a layer of a nano-porous metal oxide semiconductor obtained by the above-mentioned process.

Preferred embodiments are disclosed in the dependent claims.

DETAILED DESCRIPTION OF THE INVENTION

Definitions

The term nano-porous metal oxide semiconductor means a metal oxide semiconductor having pores with a size of 100 nm or less and having an internal surface area of at least 5 $m^2/g$ and not more than 300 $m^2/g$.

The term chalcogenide means a binary compound containing a chalcogen and a more electropositive element or radical. A chalcogen is an element from group IV of the periodic table including oxygen, sulphur, selenium, tellurium and polonium.

The term "support" means a "self-supporting material" so as to distinguish it from a "layer" which may be coated on a support, but which is itself not self-supporting. It also includes any treatment necessary for, or layer applied to aid, adhesion to the support.

The term continuous layer refers to a layer in a single plane covering the whole area of the support and not necessarily in direct contact with the support.

The term non-continuous layer refers to a layer in a single plane not covering the whole area of the support and not necessarily in direct contact with the support.

The term coating is used as a generic term including all means of applying a layer including all techniques for producing continuous layers, such as curtain coating, doctor-blade coating etc., and all techniques for producing non-continuous layers such as screen printing, ink jet printing, flexographic printing, and techniques for producing continuous layers.

The abbreviation PEDOT represents poly(3,4-ethylenedioxy-thiophene).

The abbreviation PSS represents poly(styrene sulphonic acid) or poly(styrenesulphonate).

Process for Preparing a Layer of a Nano-porous Metal Oxide Semiconductor

Aspects of the present invention are realized by a process for preparing a layer of a nano-porous metal oxide semiconductor comprising the steps of: (i) providing metal oxide semiconductor nano-particles prepared by a wet precipitation process, (ii) heating said nano-particles at a temperature in the range of 250 to 600° C., (iii) preparing a dispersion of the heat-treated nano-particles from step (ii), (iv) applying the dispersion of step (iii) to a support to produce a coating; and (v) subjecting said coating to a pressure in the range of 100 to 1000 bar at a temperature below 250° C.

According to a first embodiment of the process, according to the present invention, the metal oxide semiconductor is n-type.

According to a second embodiment of the process, according to the present invention, the nano-porous metal oxide semiconductor has a band-gap of greater than 2.9 eV.

According to a third embodiment of the process, according to the present invention, the nano-porous metal oxide semiconductor nano-particle have a mean number averaged particle size $\leq 20$ nm.

According to a fourth embodiment of the process, according to the present invention, the nano-porous metal oxide semiconductor is selected from the group consisting of titanium oxides, tin oxides, niobium oxides, tantalum oxides, tungsten oxides and zinc oxides.

According to a fifth embodiment of the process, according to the present invention, the nano-porous metal oxide semiconductor is titanium dioxide.

According to a sixth embodiment of the process, according to the present invention, the nano-porous metal oxide semiconductor is titanium dioxide and between 80 and 100% thereof has an anatase morphology.

According to a seventh embodiment of the process, according to the present invention, the nano-porous metal oxide semiconductor is titanium dioxide and between 90 and 100% thereof has an anatase morphology.

According to an eighth embodiment of the process, according to the present invention, the pretreatment temperature is in the range of 300 to 500° C.

According to a ninth embodiment of the process, according to the present invention, the pretreatment temperature is in the range of 350 to 450° C.

According to a tenth embodiment of the process, according to the present invention, the sintering pressure is in the range of 300 to 700 bar. According to an eleventh embodiment of the process, according to the present invention, the sintering pressure is in the range of 400 to 600 bar.

According to a twelfth embodiment of the process, according to the present invention, the process further comprises heating the coating subjected to pressure from step (v)

at a temperature of 100 to 200° C. According to a thirteenth embodiment of the process, according to the present invention, the process further comprises heating the coating subjected to pressure from step (v) at a temperature of 125 to 170° C.

According to a fourteenth embodiment of the process, according to the present invention, step (v) is carried out at a temperature above 0° C.

Step (ii) of the process, according to the present invention, is carried out under the atmosphere and pressure necessary to obtain metal oxide nano-particles with semiconducting properties. According to a fifteenth embodiment of the process, according to the present invention, step (ii) is carried out at under an ambient atmosphere i.e. at the pertaining ambient pressure and under the pertaining ambient atmosphere.

The sintering pressure for a particular layer of a nano-porous metal oxide semiconductor is dependent upon the nature of the support, a sintering pressure of 300 to 700 bar being suitable for glass supports and sintering pressures up to 1000 bar being suitable for polymeric film supports.

For efficient solar cells, the coating of the nano-porous TiO2 should be between 8 and 12 μm in order to have sufficient light absorption for generating power conversion efficiencies up to 5 to 8%. The thicker the titanium dioxide coating, the longer the pathway for the charges (electrons) have to be transported to the charge collecting electrode and the greater the probability of recombination occurring with resultant power conversion efficiency loss. In order to circumvent this problem smaller titanium dioxide nano-particles can be used, having a larger specific surface and hence enabling thinner layers to be realized with the same light absorbance values. In this way, photovoltaic cells with higher efficiencies can be obtained due to the fact that the probability of recombination is reduced due to the path traversed by the electrons to the charge collecting electrode being shorter.

Step (i) of the process, according to the present invention, provides metal oxide semiconductor nano-particles prepared by a wet precipitation process. The expression "wet precipitation process" distinguishes the metal oxide semiconductor nano-particles used in the process, according to the present invention, from those prepared by non-wet chemical processes such as flame pyrolysis processes such as that operated by Degussa. Suitable titanium dioxide nano-particles produced by wet precipitation processes include:

| | |
|---|---|
| Ti-Nanoxide ™ T = | a nano-sized anatase titanium dioxide with a mean particle size of 13 nm and a specific surface of 120 m²/g from SOLARONIX SA; |
| Ti-Nanoxide ™ HT = | a nano-sized anatase titanium dioxide with a mean particle size 9 nm and specific surface of 165 m²/g from SOLARONIX SA; | which are often used as n-type semi-conductor nano-particles in making Graetzel-type photovoltaic cells, but can be also readily synthesized using fairly straightforward precipitation techniques familiar in colloid chemistry, such as described, for example, in 1997 by Barbe et al in Journal of the American Ceramic Society, volume 80(12), pages 3157–3171, herein incorporated by reference.

Spectral Sensitization of Nano-porous Metal Oxide Semiconductor Layers

Aspects of the present invention are also realized by a layer of a nano-porous metal oxide semiconductor obtained by a process, according to the present invention.

According to a first embodiment of the layer, according to the present invention, the layer contains at least one spectral sensitizer for the nano-porous metal oxide semiconductor selected from the group consisting of metal chalcogenide nano-particles with a band-gap between 1.5 and 2.9 eV, organic dyes, and metallo-organic dyes.

According to a second embodiment of the layer, according to the present invention, the layer contains at least one spectral sensitizer for the nano-porous metal oxide semiconductor selected from the group consisting of metal oxides, metal sulphides and metal selenides.

According to a third embodiment of the layer, according to the present invention, the layer contains at least one spectral sensitizer for the nano-porous metal oxide semiconductor which is a metal sulphide.

According to a fourth embodiment of the layer, according to the present invention, the layer contains at least one spectral sensitizer for the nano-porous metal oxide semiconductor selected from the group consisting of lead sulphide, bismuth sulphide, cadmium sulphide, silver sulphide, antimony sulphide, indium sulphide, copper sulphide, cadmium selenide, copper selenide, indium selenide, cadmium telluride or a mixture of two or more thereof.

Vogel et al. in 1990 in Chemical Physics Letters, volume 174, page 241, herein incorporated by reference, reported theسensitization of highly porous $TiO_2$ with in-situ prepared quantum size CdS particles (40–200 Å), a photovoltage of 400 mV being achieved with visible light and high photon to current efficiences of greater than 70% being achieved at 400 nm and an energy conversion efficiency of 6.0% under monochromatic illumination with λ=460 nm. In 1994 Hoyer et al. reported in Applied Physics, volume 66, page 349, that the inner surface of a porous titanium dioxide film could be homogeneously covered with isolated quantum dots and Vogel et al. reported in Journal of Physical Chemistry, volume 98, pages 3183–3188, herein incorporated by reference, the sensitization of various nanoporous wide-bandgap semiconductors, specifically $TiO_2$, $Nb_2O_5$, $Ta_2O_5$, $SnO_2$ and ZnO, with quantum-sized PbS, CdS, $Ag_2S$, $Sb_2S_3$ and $Bi_2S_3$ and the use of quantum dot-sensitzed oxide semiconductors in liquid junction cells. The internal photo-current quantum yield decreased with increasing particle diameter and decreased in the order $TiO_2 > ZnO > Nb_2O_5 > SnO_2 > Ta_2O_5$.

EP-A 1 176 646, herein incorporated by reference, discloses a solid state p-n heterojunction comprising an electron conductor and a hole conductor, characterized in that if further comprises a sensitizing semiconductor, said sensitizing being located at an interface between said electron conductor and said hole conductor; and its application in a solid state sensitized photovolaic cell. In a preferred embodiment the sensitizing semiconductor is in the form of particles adsorbed at the surface of said electron conductor and in a further preferred embodiment the sensitizing semiconductor is in the form of quantum dots, which according to a particularly preferred embodiment are particles consisting of PbS, CdS, $Bi_2S_3$, $Sb_2S_3$, $Ag_2S$, INAs, CdTe, CdSe or HgTe or solid solutions of HgTe/CdTe or HgSe/CdSe.

Suitable spectrally sensitizing organic dyes (SSOD) include cyanine, merocyanine and anionic dyes, such as:

SSOD-01

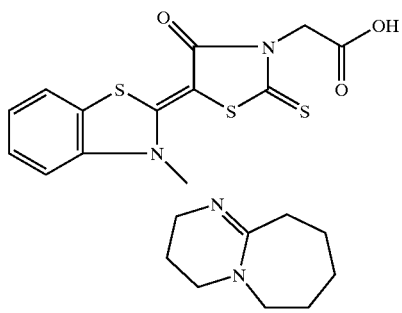

SSOD-02

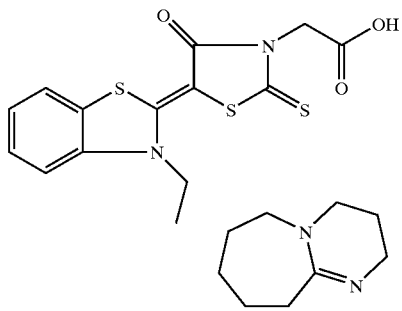

SSOD-03

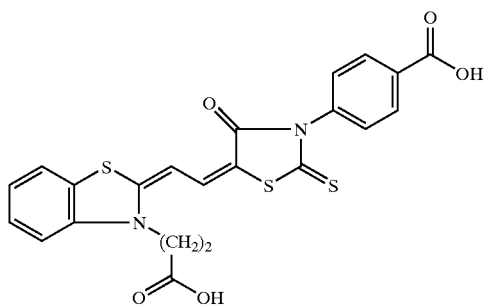

SSOD-04

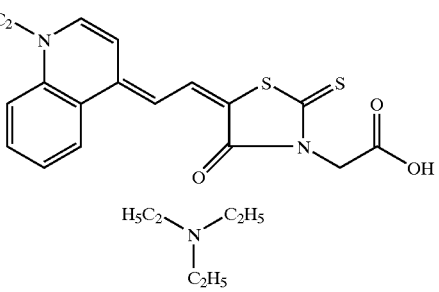

SSOD-05

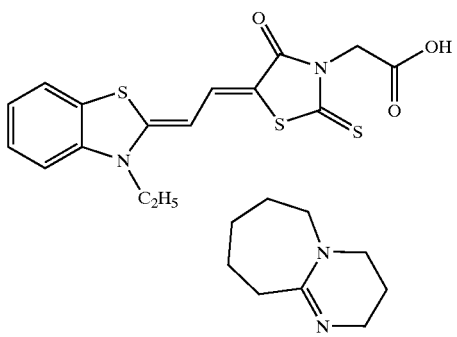

Suitable spectrally sensitizing metallo-organic dyes allowing for broad absorption of the solar spectrum include:

| | chemical name |
|---|---|
| Ruthenium 470, a ruthenium dye from Solaronix | tris(2,2'bipyridyl-4,4' dicarboxylato) ruthenium (II) dichloride |
| Ruthenium 505, a ruthenium dye from Solaronix | cis-bis(isocyanato) (2,2'bipyridyl-4,4' dicarboxylato) ruthenium (II) |
| Ruthenium 535, a ruthenium dye from Solaronix | cis-bis(isothiocyanato)bis(2,2'-bipyridyl-4,4'-dicarboxylato)-ruthenium(II) |
| Ruthenium 535 bis-TBA, a ruthenium dye from Solaronix | cis-bis(isothiocyanato)bis(2,2'-bipyridyl-4,4'-dicarboxylato)-ruthenium(II) bis-tetrabutylammonium |

[Structure of Ruthenium 535 bis-TBA shown]

| | |
|---|---|
| Ruthenium 620 "Black Dye", a ruthenium dye from Solaronix | (anion only) tris(isothiocyanato)-ruthenium(II)-2,2':6',2"-terpyridine-4,4',4"-tricarboxylic acid |

Support

Supports for use according to the present invention include polymeric films, silicon, ceramics, oxides, glass, polymeric film reinforced glass, glass/plastic laminates, metal/plastic laminates, paper and laminated paper, optionally treated, provided with a subbing layer or other adhesion promoting means to aid adhesion to the layer configuration, according to the present invention. Suitable polymeric films are poly(ethylene terephthalate), poly(ethylene naphthalate), polystyrene, polyethersulphone, polycarbonate, polyacrylate, polyamide, polyimides, cellulosetriacetate, polyolefins and poly(vinyl chloride), optionally treated by corona discharge or glow discharge or provided with a subbing layer.

Photovoltaic Devices

Aspects of the present invention are realized by a photovoltaic device comprising a layer of a nano-porous metal oxide semiconductor obtained by a process, according to the present invention.

Photovoltaic devices comprising a layer of a nano-porous metal oxide semiconductor prepared by a process, according to the present invention, can be of two types: the regenerative type which converts light into electrical power leaving no net chemical change behind in which current-carrying electrons are transported to the anode and the external circuit and the holes are transported to the cathode where they are oxidized by the electrons from the external circuit and the photosynthetic type in which there are two redox systems one reacting with the holes at the surface of the semiconductor electrode and one reacting with the electrons entering the counter-electrode, for example, water is oxidized to oxygen at the semiconductor photoanode and reduced to hydrogen at the cathode. In the case of the regenerative type of photovoltaic cell, as exemplified by the Graetzel cell, the hole transporting medium may be a liquid electrolyte supporting a redox reaction, a gel electrolyte supporting a redox reaction, an organic hole transporting material, which may be a low molecular weight material such as 2,2',7,7'-tetrakis (N,N-di-p-methoxyphenyl-amine)9,9'-spirobifluorene (OMeTAD) or triphenylamine compounds or a polymer such as PPV-derivatives, poly(N-vinylcarbazole) etc., or inorganic semiconductors such as CuI, CuSCN etc. The charge transporting process can be ionic, as for example in the case of a liquid electrolyte or gel electrolyte or electronic, as for example in the case of organic or inorganic hole transporting materials.

Such regenerative photovoltaic devices can have a variety of internal structures in conformity with the end use. Conceivable forms are roughly divided into two types: structures which receive light from both sides and those which receive light from one side. An example of the former is a structure made up of a transparently conductive layer e.g. an ITO-layer or a PEDOT/PSS-containing layer and a transparent counter electrode electrically conductive layer e.g. an ITO-layer or a PEDOT/PSS-containing layer having interposed therebetween a photosensitive layer and a charge transporting layer. Such devices preferably have their sides sealed with a polymer, an adhesive etc. to prevent deterioration or volatilization of the inside substances. The external circuit connected to the electrically-conductive substrate and the counter electrode via the respective leads is well-known.

Alternatively the layer of a nano-porous metal oxide semiconductor prepared by a process, according to the present invention, can be incorporated in hybrid photovoltaic compositions such as described in 1991 by Graetzel et al. in Nature, volume 353, pages 737–740, in 1998 by U. Bach et al. [see Nature, volume 395, pages 583–585 (1998)] and in 2002 by W. U. Huynh et al. [see Science, volume 295, pages 2425–2427 (2002)].

Industrial Application

Layers of nano-porous metal oxide semiconductors prepared according the process, according to the present invention, can be used in both regenerative and photosynthetic photovoltaic devices.

The invention is illustrated hereinafter by way of reference and invention photovoltaic devices. The percentages and ratios given in these examples are by weight unless otherwise indicated.

EXAMPLE 1

Preparation of Titanium Dioxide Nano Dispersions
Dispersion 1:
P25 a nano-sized titanium dioxide with a mean particle size of 25 nm and a specific surface of 55 $m^2/g$ from DEGUSSA was mixed with ethanol to give a 25% by weight of solid material and then treated ultrasonically to produce Dispersion 1.
Dispersion 2:
285 g of Ti-isopropoxide, 1800 mL of deionized water and 12.5 mL of nitric acid were stirred overnight at 80° C. without a cover. The total volume was made up to 1400 mL with deionized water and then autoclaved at 230° C. for 14 hours. The concentration of the autoclaved colloid was reduced by evaporation to 16.2% by weight of solid material and then sufficient ethanol added to give a final solids content of 10.8% by weight, thereby producing Dispersion 2 (mean particle size of 13 nm, specific surface area 120 $m^2/g$).
Dispersion 3:
Ti-Nanoxide™ T from SOLARONIX, having a mean particle size of 13 nm, a specific surface of 120 $m^2/g$ and containing 11% by weight of titanium oxide is called dispersion 3.

Heat Pretreatment of the Titanium Dioxide Nano Dispersions

Dispersions 2 or 3 were dried in a rotary evaporator, ground, spread on a sheet of glass and heated at 200, 350, 400 or 450° C., depending on the experiment, for 30 minutes in a rotary tube furnace. The resulting powders were then cooled, ground again and converted into a paste by adding water, ethanol and 10–20 µL of nitric acid. To prevent material loss, the paste was diluted with water and put in a bottle. The excess liquid was evaporated at a temperature of 100–150° C. prior to use.
Evaluation in Photovoltaic Devices with Liquid Electrolyte
Photovoltaic devices 1–46 were prepared by the following procedure:
Preparation of the Front Electrode:
A glass plate (2×7 $cm^2$) coated with conductive $SnO_2$:F (Pilkington TEC15/3) with a surface conductivity of ca 15 Ohm/square was ultrasonically cleaned in isopropanol for 5 minutes and then dried. The electrode was taped off at the borders and was doctor blade-coated in the middle (0.7×4.5 $cm^2$) with the titanium dioxide colloidal dispersion with or without dilution with ethanol depending upon the desired layer thickness.

The layer thickness was determined mechanically with a diamond-tipped probe (Perthometer) and interferometry and are given in Tables 1 to 4.
i) Front Electrodes Prepared by High Temperature Sintering of Nano-porous Titanium Dioxide Layers:
Coated glass electrodes with the nano titanium dioxide dispersions were heated at 450° C. for 30 minutes, then cooled to 150° C. by placing it on a hot plate at 150° C. for 10 minutes, then immediately immersed in a 2×10⁻⁴ M solution of the Ruthenium 535 dye (SOLARONIX) for 15 to 17 hours followed by rinsing with acetonitrile to remove the non-adsorbed dye and drying at 50° C. for several minutes. The front electrode thereby produced was immediately used in assembling the corresponding photovoltaic cell.
ii) Front Electrodes Prepared by High Pressure Sintering of Nano-porous Titanium Dioxide Layers:
Coated glass electrodes with the nano titanium dioxide dispersions were first dried at 110° C. for 5 minutes, then, after cooling to room temperature (25° C.), a pressure of 500 bars was applied for 5 seconds. These pressure sintered coatings were then heated to 110–150° C., then immediately immersed in a 2×10⁻⁴ M solution of the Ruthenium 535 bis-TBA dye (SOLARONIX) for 15 to 17 hours followed by rinsing with acetonitrile to remove non-adsorbed dye and drying at 50° C. for several minutes. The front electrode thereby produced was immediately used in assembling the corresponding photovoltaic cell.

Cell Assembly

The back electrode (consisting of $SnO_2$:F glass (Pilkington TEC15/3) evaporated with platinum to catalyze reduction of the electrolyte) was sealed together with the front electrode with two pre-patterned layers of Surlyn® (DuPont) (2×7 cm² where in the middle 1×6 cm² had been removed) in between. This was performed at a temperature just above 100° C. on a hotplate. As soon as the sealing was completed, the cell was cooled to room temperature (25° C.) and electrolyte was added through holes in the counter electrode. The electrolyte used was a solution of 0.5 M LiI, 0.05 M $I_2$ and 0.4 M t-butylpyridine in acetonitrile and was injected into the cell during cell assembly. The holes were then sealed with Surlyn® and a thin piece of glass. Conductive tape was attached on both long sides of the cell to collect the electricity during measurement. Measurements were performed immediately after cell assembly.

Device Characterisation:

The cell was irradiated with a Steuernagel Solar Constant 575 solar simulator with a metal halide 1 AM light source. The simulator was adjusted to about 1 sunequivalent. The electricity generated was recorded with a Type 2400 SMU Keithley electrometer.

The most relevant parameter for these experiments was the short circuit current ($I_{sc}$) which is given for the examples in Tables 1 to 4. The open circuit voltage was in all cases almost the same (0.640 to 0.680), which was also the case for the fill factor (FF) (0.5 to 0.6). Cells with lower open circuit voltages than 0.640 V or fill factors lower than 0.5 were not considered.

i) Photovoltaic Devices Incorporating Sintered Titanium Dioxide Layers Prepared with Dispersion 1:

The device parameters for reference photovoltaic devices incorporating front electrodes with sintered titanium dioxide prepared with Dispersion 1 together with the sintering conditions are given in Table 1.

The results in Table 1 show that Devices incorporating high pressure sintered titanium dioxide layers prepared with Dispersion 1 yielded, for similar layer thicknesses, comparable short circuit currents, $I_{sc}$, to Devices incorporating high temperature sintered titanium dioxide layers, as to be expected from the teaching of WO 00/72373.

TABLE 1

| Device | TiO₂ dispersion | Heat pretreatment | Pretreatment temperature [° C.] | Sintering conditions | Layer thickness (μm) | $I_{sc}$ [mA/cm²] |
|---|---|---|---|---|---|---|
| 1 (ref) | 1 | No | — | 450° C. | 3.2 | 4.76 |
| 2 (ref) | 1 | No | — | 450° C. | 3.6 | 4.56 |
| 3 (ref) | 1 | No | — | 450° C. | 4.8 | 5.49 |
| 4 (ref) | 1 | No | — | 450° C. | 8.0 | 5.40 |
| 5 (ref) | 1 | No | — | 450° C. | 17.0 | 5.80 |
| 6 (ref) | 1 | No | — | Pressure | 1.4 | 1.32 |
| 7 (ref) | 1 | No | — | Pressure | 2.1 | 1.68 |
| 8 (ref) | 1 | No | — | Pressure | 2.5 | 2.58 |
| 9 (ref) | 1 | No | — | Pressure | 4.0 | 4.90 |
| 10 (ref) | 1 | No | — | Pressure | 5.5 | 4.37 |
| 11 (ref) | 1 | No | — | Pressure | 5.9 | 5.19 |
| 12 (ref) | 1 | No | — | Pressure | 9.5 | 4.58 |
| 13 (ref) | 1 | No | — | Pressure | 16.0 | 5.50 | ii) Photovoltaic Devices Incorporating Sintered Titanium Dioxide Layers Prepared with Dispersions 1 and 2:

The short circuit currents, $I_{sc}$, for photovoltaic devices incorporating front electrodes with sintered titanium dioxide layers prepared with Dispersion 2 are given in Table 2 together with information concerning the heat pretreatment of Dispersion 2 and the sintering conditions used. The short circuit currents, $I_{sc}$, device parameters for the photovoltaic devices of reference Devices 2, 8 and 9 are also included in Table 2 by way of reference.

TABLE 2

| Device | TiO₂ dispersion | Heat pretreatment | Pretreatment temperature [° C.] | Sintering conditions | Layer thickness (μm) | $I_{sc}$ [mA/cm²] |
|---|---|---|---|---|---|---|
| 2 (ref) | 1 | No | — | 450° C. | 3.6 | 4.56 |
| 8 (ref) | 1 | No | — | Pressure | 2.5 | 2.58 |
| 9 (ref) | 1 | No | — | Pressure | 4.0 | 4.90 |
| 14 (comp) | 2 | No | — | 450° C. | 2.8 | 7.02 |
| 15 (comp) | 2 | No | — | Pressure | 3.1 | 0.96 |
| 16 (comp) | 2 | Yes | 450° C. | 450° C. | 2.6 | 6.68 |
| 17 (inv) | 2 | Yes | 450° C. | Pressure | 3.1 | 6.73 |

The results in Table 2 show that photovoltaic cells incorporating high temperature sintered titanium dioxide layers, as expected from the prior art, exhibited high short circuit currents, that prepared with Dispersion 2 without heat pretreatment exhibiting a much higher short circuit currents than those exhibited by photovoltaic cells incorporating high temperature sintered titanium dioxide layers prepared with Dispersion 1.

The results in Table 2 also show that for comparable titanium dioxide layer thicknesses the photovoltaic cell of Device 2 incorporating a high pressure sintered titanium dioxide layer prepared with Dispersion 1 exhibited a comparable short circuit current to that of Device 9 incorporating a high temperature sintered titanium dioxide layer prepared with Dispersion 1, in accordance with the teaching of WO 00/72373.

iii) Influence of Titanium Dioxide Layer Thickness on Photovoltaic Device Performance:

Table 3 gives the results obtained with further photovoltaic devices with front electrodes prepared with Dispersion 2 for different titanium dioxide layer thicknesses, together with information regarding the heat pretreatment and sintering conditions. The short circuit currents, $I_{sc}$, device parameters for the photovoltaic devices of comparative Device 14 and invention device 17 are also included in Table 3 for the sake of comparison.

TABLE 3

| Device | TiO$_2$ dispersion | Heat pretreatment | Pretreatment temperature [° C.] | Sintering conditions | Layer thickness ($\mu$m) | $I_{sc}$ [mA/cm$^2$] |
|---|---|---|---|---|---|---|
| 18 (comp) | 2 | No | — | 450° C. | 2.6 | 7.24 |
| 19 (comp) | 2 | No | — | 450° C. | 2.7 | 6.83 |
| 14 (comp) | 2 | No | — | 450° C. | 2.8 | 7.02 |
| 20 (comp) | 2 | Yes | 450° C. | 450° C. | 0.9 | 2.45 |
| 21 (comp) | 2 | Yes | 450° C. | 450° C. | 1.0 | 2.51 |
| 22 (comp) | 2 | Yes | 450° C. | 450° C. | 1.5 | 4.21 |
| 23 (comp) | 2 | Yes | 450° C. | 450° C. | 1.5 | 4.42 |
| 24 (comp) | 2 | Yes | 450° C. | 450° C. | 1.7 | 4.10 |
| 25 (comp) | 2 | Yes | 450° C. | 450° C. | 1.8 | 5.17 |
| 26 (comp) | 2 | Yes | 450° C. | 450° C. | 2.5 | 6.41 |
| 16 (comp) | 2 | Yes | 450° C. | 450° C. | 2.6 | 6.68 |
| 27 (comp) | 2 | Yes | 450° C. | 450° C. | 2.6 | 7.83 |
| 28 (comp) | 2 | Yes | 450° C. | 450° C. | 3.8 | 7.00 |
| 29 (comp) | 2 | Yes | 450° C. | 450° C. | 4.8 | 7.81 |
| 30 (inv) | 2 | Yes | 450° C. | Pressure | 0.7 | 1.82 |
| 31 (inv) | 2 | Yes | 450° C. | Pressure | 0.8 | 2.00 |
| 32 (inv) | 2 | Yes | 450° C. | Pressure | 0.8 | 1.63 |
| 33 (inv) | 2 | Yes | 450° C. | Pressure | 1.4 | 4.18 |
| 34 (inv) | 2 | Yes | 450° C. | Pressure | 1.4 | 3.62 |
| 35 (inv) | 2 | Yes | 450° C. | Pressure | 1.5 | 3.75 |
| 36 (inv) | 2 | Yes | 450° C. | Pressure | 1.5 | 3.82 |
| 37 (inv) | 2 | Yes | 450° C. | Pressure | 2.2 | 4.14 |
| 38 (inv) | 2 | Yes | 450° C. | Pressure | 2.4 | 4.91 |
| 17 (inv) | 2 | Yes | 450° C. | Pressure | 3.1 | 6.73 |

However, if photovoltaic cells incorporated titanium layers prepared with Dispersion 2 without pretreatment, Device 15 incorporating a high pressure sintered layer exhibited a short circuit current which was much lower that that of Device 14 incorporating a high temperature sintered layer, at variance the teaching of WO 00/72373.

If, however, Dispersion 2 pretreated at 450° C. was used, according to the present invention, instead of Dispersion 2 without pretreatment, then short circuit currents comparable with that observed with Device 14 incorporating a high temperature sintered layer of Dispersion 2 without pretreatment were observed, whether high pressure sintering was used, as in the case of Device 17, or high temperature sintering was used, as in the case of Device 16.

This demonstrates the advantage of the present invention in making it possible to realize high short circuit currents in photovoltaic devices incorporating a high temperature sintering layer of a metal oxide semiconductor nano-particle dispersion prepared by a wet precipitation process, if the dispersion is subjected to prior thermal treatment.

The results in Table 3 show that the short circuit current increased with titanium dioxide layer thickness for photovoltaic devices incorporating high pressure sintered titanium dioxide layer prepared with Dispersion 2 with heat pretreatment, according to the present invention, and moreover that the short circuit currents for photovoltaic devices with high temperature sintered titanium dioxide layers prepared with Dispersion 2 with heat pretreatment were comparable to those attained with photovoltaic devices incorporating high pressure sintered titanium dioxide layers at all titanium dioxide layer thicknesses.

iv) Influence of the Heat Pretreatment Temperature Used for the Titanium Dioxide Dispersion Upon Photovoltaic Device Performance:

The short circuit currents, $I_{sc}$, for photovoltaic devices with front electrodes incorporating sintered titanium dioxide layers prepared with Dispersion 3 sintered at different pretreatment temperatures are given in Table 4 together with information concerning the heat treatment of the Dispersion and of the sintering conditions used. The short circuit currents, $I_{sc}$, device parameters for the photovoltaic devices of comparative Devices 14 and 15 are also included in Table 4 for the sake of comparison.

TABLE 4

| Device | TiO$_2$ dispersion | Heat pretreatment | Pretreatment temperature [° C.] | Sintering conditions | Layer thickness (μm) | I$_{sc}$ [mA/cm$^2$] |
|---|---|---|---|---|---|---|
| 14 (comp) | 2 | No | — | 450° C. | 2.8 | 7.02 |
| 15 (comp) | 2 | No | — | pressure | 3.1 | 0.96 |
| 39 (comp) | 3 | Yes | 200 | 450° C. | 5.0 | 8.82 |
| 40 (inv) | 3 | Yes | 200 | pressure | 4.5 | 1.07 |
| 41 (comp) | 3 | Yes | 350 | 450° C. | 1.7 | 4.10 |
| 42 (inv) | 3 | Yes | 350 | pressure | 2.2 | 4.14 |
| 43 (comp) | 3 | Yes | 400 | 450° C. | 1.5 | 3.82 |
| 44 (inv) | 3 | Yes | 400 | pressure | 2.2 | 4.89 |
| 45 (comp) | 3 | Yes | 450 | 450° C. | 1.6 | 3.51 |
| 46 (inv) | 3 | Yes | 450 | pressure | 1.8 | 2.77 |
| 47 (inv) | 3 | Yes | 450 | pressure | 2.0 | 2.50 |
| 48 (inv) | 3 | Yes | 450 | pressure | 2.2 | 2.54 |
| 49 (inv) | 3 | Yes | 450 | pressure | 2.4 | 2.85 |

The results in Table 4 show that the short circuit current of photovoltaic devices incorporating a high pressure sintered titanium dioxide layer prepared with Dispersion 3 with heat pretreatment, according to the present invention, are comparable with the short circuit current of photovoltaic devices incorporating a high temperature sintered titanium dioxide layer prepared with Dispersion 3 with the same heat pretreatment for pretreatment temperatures of 350 and 400° C., see the results for Devices 42 and 44 versus Devices 41 and 43.

The short circuit currents of a photovoltaic devices incorporating a high pressure sintered titanium dioxide layer prepared with Dispersion 3 heat pretreated at 450° C., Devices 46–49, were slightly below that of Device 45 incorporating a titanium dioxide layer prepared with Dispersion 3 with the heat pretreatment at 450° C. and sintered at 450° C.

Furthermore, the short circuit current of a photovoltaic device incorporating a high pressure sintered titanium dioxide layer prepared with Dispersion 3 with heat pretreatment at 200° C., Device 40, was significantly below the short circuit current of that of Device 39 incorporating a high temperature sintered titanium dioxide layer prepared with Dispersion 3 with heat pretreatment at 200° C.

EXAMPLE 2

Low Temperature Heat Treatment After High Pressure Sintering

Photovoltaic devices were prepared as described for Device numbers 46 to 49 except that the titanium dioxide layer thicknesses were different and that after sintering the titanium dioxide layers were heated for 5 minutes at 150° C. before drying. The short circuit currents obtained with these devices, Devices 50 to 52, together with details over their titanium dioxide layer thickness and processing are given in Table 5 together with the results for Devices 46 to 49.

TABLE 5

| Device | TiO$_2$ dispersion | Heat pretreatment at 450° C. | Sintering conditions | Post-pressure sintering heating temperature [° C.] | Layer thickness (μm) | I$_{sc}$ [mA/cm$^2$] |
|---|---|---|---|---|---|---|
| 46 (inv) | 3 | Yes | pressure | — | 1.8 | 2.77 |
| 47 (inv) | 3 | Yes | pressure | — | 2.0 | 2.50 |
| 48 (inv) | 3 | Yes | pressure | — | 2.2 | 2.54 |
| 49 (inv) | 3 | Yes | pressure | — | 2.4 | 2.85 |
| 50 (inv) | 3 | Yes | pressure | 150 | 0.9 | 2.05 |
| 51 (inv) | 3 | Yes | pressure | 150 | 1.1 | 2.53 |
| 52 (inv) | 3 | Yes | pressure | 150 | 1.4 | 3.03 |

Taking into account the increase in short-circuit current with increasing titanium dioxide layer thickness, it is clear that post-pressure sintering heating at moderate temperatures increased the short-circuit current observed.

The present invention may include any feature or combination of features disclosed herein either implicitly or explicitly or any generalisation thereof irrespective of whether it relates to the presently claimed invention. In view of the foregoing description it will be evident to a person skilled in the art that various modifications may be made within the scope of the invention.

Having described in detail preferred embodiments of the current invention, it will now be apparent to those skilled in the art that numerous modifications can be made therein without departing from the scope of the invention as defined in the following claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practised otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A process for preparing a layer of a nano-porous metal oxide semiconductor comprising the steps of: (i) providing metal oxide semiconductor nano-particles prepared by a wet precipitation process, (ii) heating said nano-particles at a pretreatment temperature in the range of 250 to 600° C., (iii) preparing a dispersion of said heat-treated nano-particles from step (ii), (iv) applying said dispersion prepared in step (iii) to a support to produce a coating; and (v) subjecting said coating to a sintering pressure in the range of 100 to 1000 bar at a temperature below 250° C.

2. Process according to claim 1, wherein said metal oxide is selected from the group consisting of titanium oxides, tin oxides, niobium oxides, tantalum oxides, tungsten oxides and zinc oxides.

3. Process according to claim 1, wherein said pretreatment temperature is in the range of 300 to 500° C.

4. Process according to claim 1, wherein said sintering pressure is in the range 400 to 600 bar.

5. Process according to claim 1, wherein the process further comprises heating said coating subjected to pressure from step (v) at a temperature of 100 to 200° C.

6. Process according to claim 1, wherein said nano-porous metal oxide semiconductor has a band-gap of greater than 2.9 eV.

7. Process according to claim 1, wherein said nano-porous metal oxide nano-particles have a mean number averaged particle size $\leqq 20$ nm.

* * * * *